US008639550B2

(12) United States Patent
Loring et al.

(10) Patent No.: US 8,639,550 B2
(45) Date of Patent: Jan. 28, 2014

(54) AVAILABILITY-BASED CONTACT ROUTING AND SCHEDULING SYSTEM

(75) Inventors: John Loring, Kensington, NH (US); Rupert Schmidtberg, Westford, MA (US); Carl Lambert, Boca Raton, FL (US)

(73) Assignee: TimeTrade Systems, Inc., Tewksbury, MA (US)

( * ) Notice: Subject to any disclaimer, the term of this patent is extended or adjusted under 35 U.S.C. 154(b) by 0 days.

(21) Appl. No.: 13/286,342

(22) Filed: Nov. 1, 2011

(65) Prior Publication Data

US 2012/0116830 A1     May 10, 2012

Related U.S. Application Data

(60) Provisional application No. 61/410,408, filed on Nov. 5, 2010.

(51) Int. Cl.
*G06Q 10/00* (2012.01)

(52) U.S. Cl.
USPC ....................................................... 705/7.13

(58) Field of Classification Search
USPC ....................................................... 705/7.13
See application file for complete search history.

(56) References Cited

U.S. PATENT DOCUMENTS

| 6,597,783 | B1 * | 7/2003 | Tada et al. ............... 379/265.09 |
| 7,139,389 | B2 * | 11/2006 | Duncan ..................... 379/265.01 |
| 7,174,303 | B2 | 2/2007 | Glazer et al. |
| 8,073,725 | B2 | 12/2011 | Loring et al. |
| 8,108,237 | B2 * | 1/2012 | Bourne et al. ............... 705/7.13 |
| 2004/0059700 | A1 * | 3/2004 | Park et al. ..................... 707/1 |
| 2005/0033615 | A1 | 2/2005 | Nguyen et al. |
| 2005/0120052 | A1 | 6/2005 | Miller et al. |
| 2006/0116918 | A1 | 6/2006 | Flora et al. |
| 2007/0016463 | A1 * | 1/2007 | Borders et al. ................... 705/8 |
| 2009/0222358 | A1 | 9/2009 | Bednarek |
| 2010/0114644 | A1 * | 5/2010 | Fama et al. ....................... 705/9 |
| 2010/0165977 | A1 * | 7/2010 | McCord ...................... 370/352 |
| 2010/0191566 | A1 | 7/2010 | Loring et al. |

OTHER PUBLICATIONS

International Search Report and Written Opinion in counterpart International Application No. PCT/US11/58713, mailed Feb. 1, 2012.

* cited by examiner

*Primary Examiner* — Romain Jeanty
(74) *Attorney, Agent, or Firm* — Edell, Shapiro & Finnan, LLC

(57) ABSTRACT

A contact routing and scheduling system is provided allowing users to define various contact routing and scheduling contexts to direct a contact to a calendar of appointment availability representing the availability of a set of representatives pre-qualified to have times available for an appropriate appointment and to book an appointment as an integral part of the contact routing function. The system utilizes multiple visual user interfaces to allow users, contacts, and administrators to interact with the contact routing and appointment scheduling system. The system allows for user selection of contact routing and scheduling rules, association of scheduling activities to the contact routing process, and association of representatives who will ultimately accept appointments with contacts. The system also utilizes various techniques to associate contacts with particular contact routing and scheduling contexts received by the contact through email and/or other correspondence means.

13 Claims, 13 Drawing Sheets

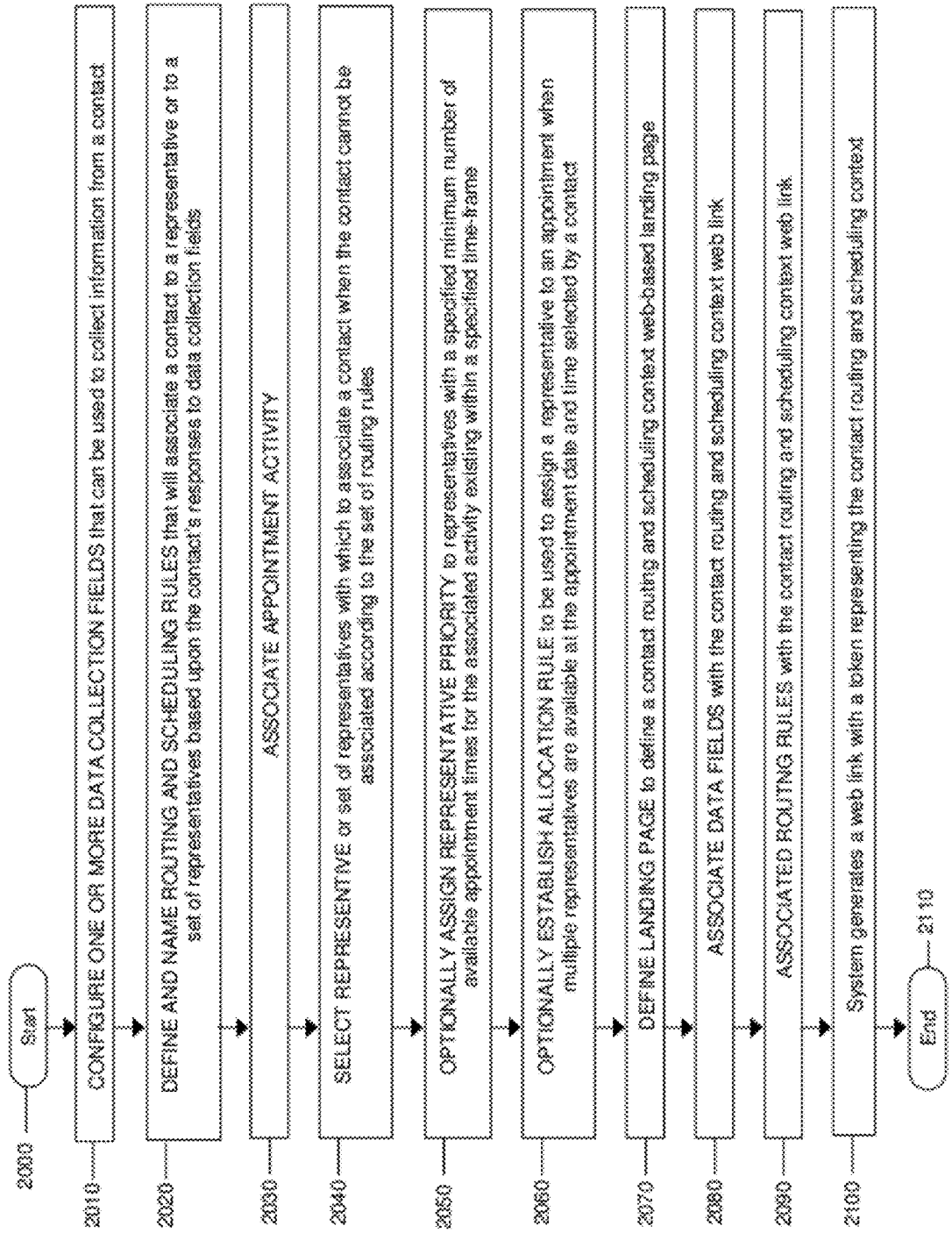

*FIG. 3A*

Custom Fields   Assignment Rules   Landing Pages

Edit Custom Field

Type:    [String]        ⎫
                         ⎬ — 2012
Name:    [Revenue]       ⎭

2013 ↗
2014 ↗

Field Values

Enter possible user input values, one per line or as a comma separated list.

Values:
```
Less than 1 million
1 - 4 million
5 - 20 million
21 - 50 million
50 - 500 million
More than 500 million
```
← 2017

← 2016

[Save]  [Cancel]

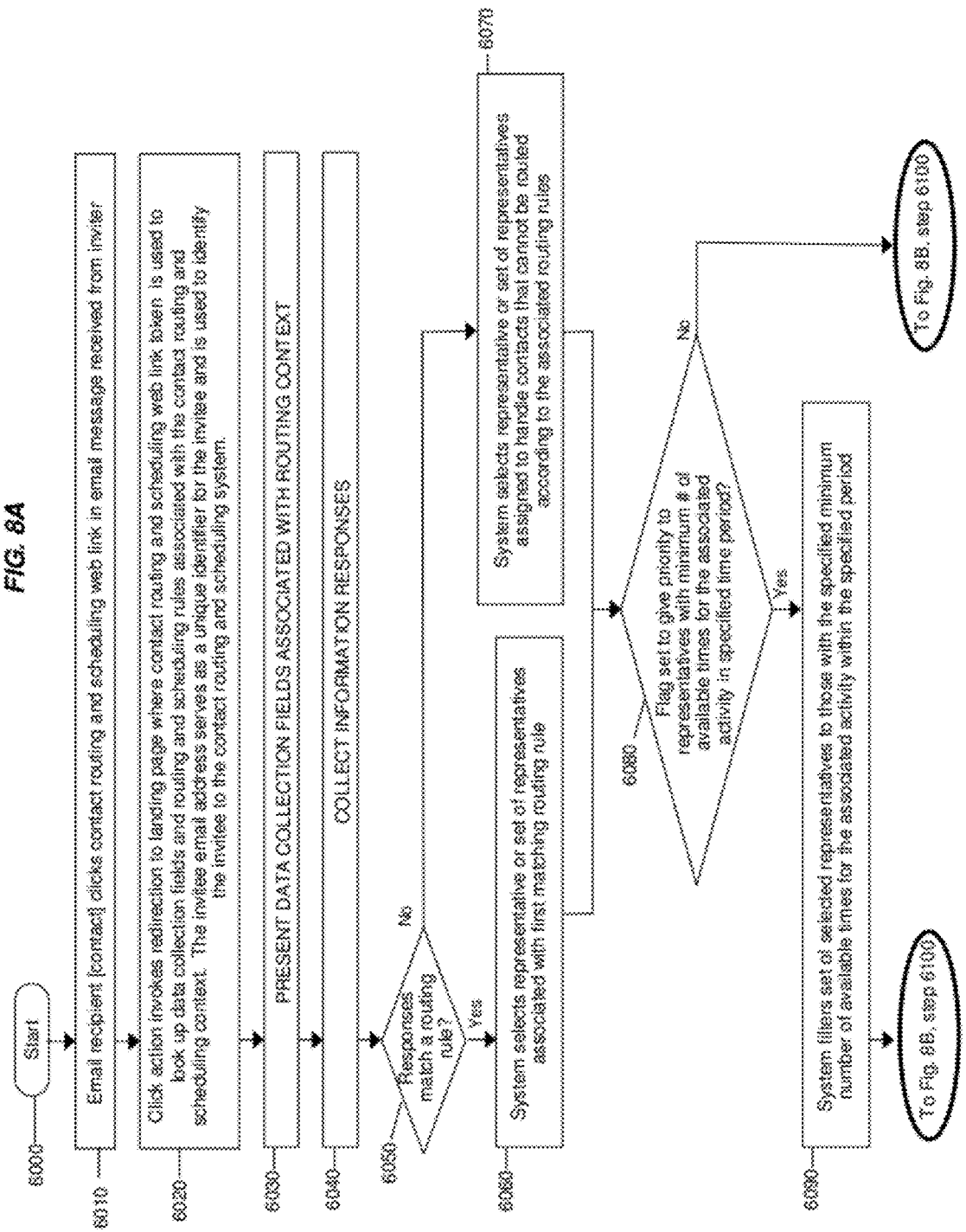

AVAILABILITY-BASED CONTACT ROUTING AND SCHEDULING SYSTEM

CROSS REFERENCE TO RELATED APPLICATION

This application claims priority under 35 U.S.C. §119(e) from U.S. Provisional Patent Application Ser. No. 61/410,408, filed Nov. 5, 2010, and entitled "Availability-Based Contact Routing and Scheduling System," the entire contents of which are hereby incorporated by reference.

FIELD OF THE INVENTION

The present invention relates generally to software appointment scheduling systems, and more specifically to software appointment scheduling systems that are "web-based", meaning that the software that implements the system is accessed through the Internet via the World Wide Web by use of a web browser. Other non-web-based scheduling software systems require installation of software on a user's computer in order to run the software.

The present invention is also related to methods and systems for assigning customers, prospects, sales and marketing leads, and other contacts (herein referred to as contacts) to a representative qualified to follow-up with the contact.

BACKGROUND OF THE INVENTION

Existing contact (lead) routing systems assign each contact to a representative who subsequently coordinates with the contact to arrange a follow-up appointment. Existing systems used to route contacts do not incorporate the appointment booking process, leaving those persons representing contacts waiting until an assigned representative has time to arrange a follow-up appointment.

Existing systems do not provide a convenient mechanism by which a contact can choose a convenient appointment time as part of the process of contacting an organization.

Existing systems do not take into account availability of representatives to which contacts are assigned during the routing process. Such systems may assign a contact to a representative who has no near-term availability, causing potential delays in the process of arranging a suitable appointment time between the contact and a representative. Existing systems do not provide a mechanism by which availability rules and free/busy information from each qualified representative's primary calendar are cross-referenced as a means to ensure that only representatives are offered who have available times meeting near-term availability rules associated with the routing context.

Existing systems do not provide a means to embed a customizable action button, link, Universal Resource Locator (URL), or image within the body of an email message or on a web page or on printed materials, with the button, link, URL, or image representing a specific routing context that embeds appointment scheduling.

SUMMARY OF THE INVENTION

A web-based contact routing and appointment scheduling system is provided that is designed to overcome the previously mentioned shortcomings, to give organizations a means to more efficiently book meetings and appointments with customers, prospects, partners, and other contacts of the organization. A contact routing and scheduling context is created that incorporates rules for directing contacts to a set of qualified representatives, offering available appointment times aggregated across the set of representatives, allowing a contact to choose an available appointment time, and book an appointment with a specific representative who is available at the appointment time chosen by the contact.

The system and methods described herein introduces appointment booking into the contact capture and routing process to direct a contact to a calendar of appointment availability representing the aggregate availability of the set of representatives pre-qualified to have times available for an appropriate appointment, then books an appointment as an integral part of the contact routing function.

Unique to the system is insertion of an appointment booking operation as a part of the routing process, wherein routing data is integral to appointment availability (the routing context and collected information is used to filter the set of qualifying representatives of which availability is offered) and subsequent appointment availability is integral to the routing process (availability determines final allocation/assignment of a representative to the contact and to the resulting appointment).

Further, as a web-based system, multiple routing contexts could be defined, each incorporating routing rules and representative availability rules, and embedded in a tokenized web link published in an email message or published on printed material and distributed to a large number of contacts. Further, such a tokenized web link may be incorporated into a web page to invite users who view the web page. As a web-based system, users are not tied to any one machine where they may have to install routing and scheduling software.

Therefore, it is an object of the present invention to overcome the previously mentioned shortcomings found in contact routing systems to allow an organization or person the ability to configure the system to define a contact routing context that specifies rules that determine a set of representatives to which a contact can potentially be assigned, associate an appointment activity that will be scheduled between the contact and the representative, specify availability rules that determine whether a representative's availability should be included in the appointment availability offered to a contact, and specify rules that determine which specific representative among those available at a contact's chosen appointment will be allocated to the appointment. The methods of configuring the system to automatically associate a contact with a set of representatives and to generate available appointment times that will be offered include: selecting specific representatives, selecting groups of representatives, defining rules that select representatives, defining rules that filter a set of representatives according to availability, utilization, rank, skill, priority, or other attributes used to differentiate one representative from another, and/or defining discrete availability for representatives associated with a contact routing context. Later, at the moment a contact seeks an available appointment time, the system will cross-reference free/busy information from a representative's primary calendar and will not offer timeslots that would conflict with existing commitments in a representative's primary calendar.

Another object of the present invention is to provide a method by which users can reference a contact routing context as a tokenized contact routing and scheduling web link (e.g., URL) where contacts are routed to an appropriate set of representatives and are invited to schedule an appointment with a representative. In the present invention, such tokenized contact routing and scheduling web link can be embedded by the user on Web pages and in email invitations or published on hardcopy printed materials. Users can create an unlimited number of such tokenized contact routing and scheduling web links.

Another object of the present invention is to provide a method by which the system can embed a special modified version of the aforementioned tokenized contact routing and scheduling web link in email invitations, whereby the modified token includes a reference to the contact's unique email address. This reference makes it possible for the system to automatically identify and authenticate a contact for the routing and scheduling transaction.

Another object of the invention is to provide a method by which the system can embed a customizable button, link, or image in email messages to perform the same function as the special modified version of the tokenized contact routing and scheduling web link. For example, a button can be customized by the user to carry a label such as "Click To Schedule A Product Demonstration Meeting", thereby unambiguously compelling the contact to initiate a scheduling transaction to establish an appointment.

BRIEF DESCRIPTION OF THE DRAWINGS

FIG. 2 depicts an example of a flow chart illustrating examples of operations involved in defining a routing and scheduling context used to route and schedule one or more contacts.

FIG. 3A is a screen shot depicting an example of a user interface screen to configure user defined data collection fields for a contact routing a scheduling context.

FIG. 3B is a screen shot depicting an example of a user interface screen to configure contact routing and scheduling rules.

FIG. 3C is a screen shot depicting an example of a user interface screen to configure a contact routing and scheduling landing page.

FIGS. 8A and 8B depict a flow chart illustrating operations involved in a contact to responding to an email invitation to provide routing information and to schedule an appointment with a representative.

DETAILED DESCRIPTION

Figure 1A:
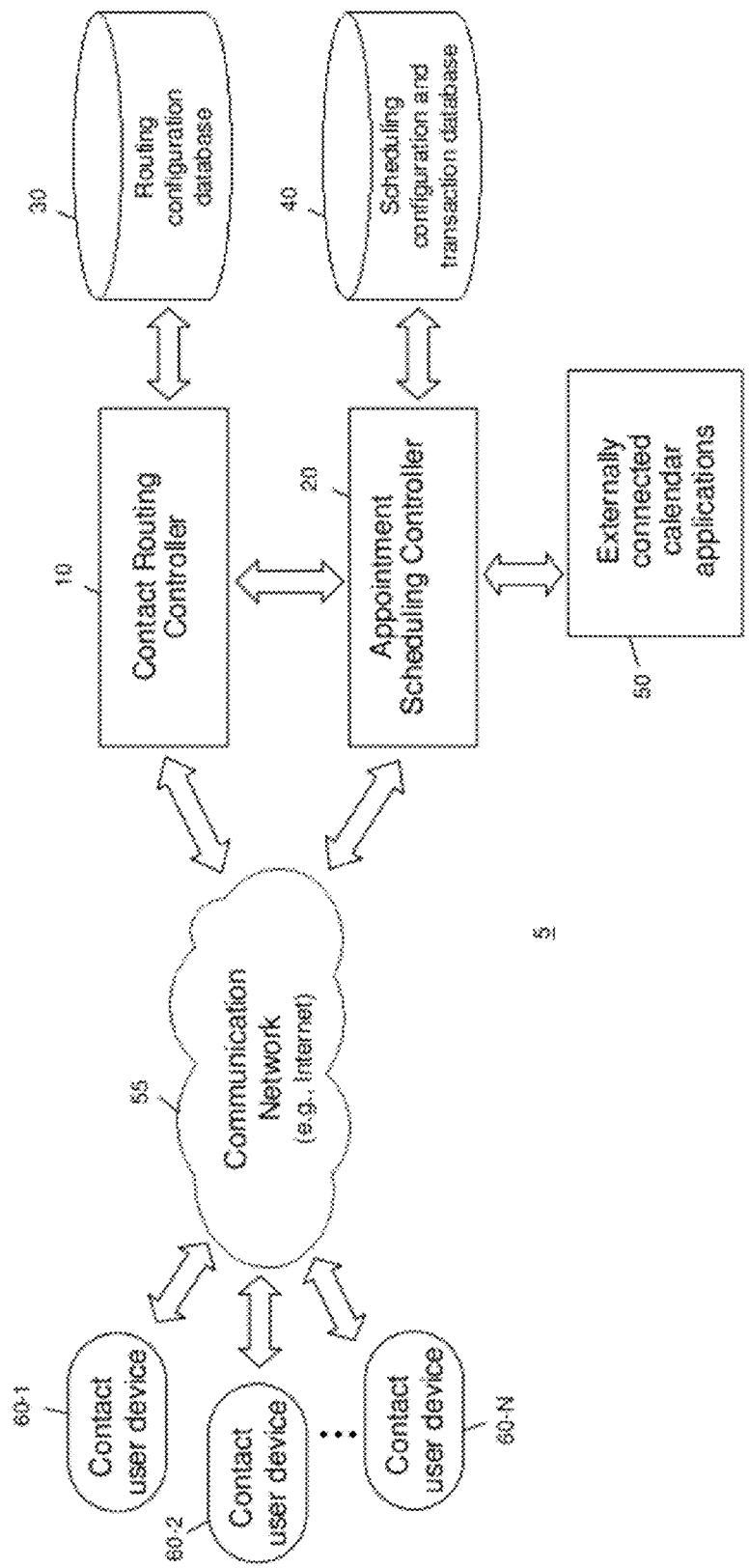
FIG. 1A is an example of a system block diagram illustrating the components of a web-based contact routing and appointment scheduling system and its associated information pathways.

The present invention is directed to systems and methods that utilize availability information and other parameters associated with a set of representatives to provide a contact (that is, a person) with an immediate capability to book an appointment with a qualified representative (another person or entity), thereby removing the delay and additional representative/contact coordination operations involved in existing contact-to-representative assignment systems.

The systems and methods disclosed herein are well suited for sales and marketing lead management, in particular, the routing of Search Engine Optimization (SEO)-based leads from the web. The Customer Relationship Management (CRM) industry has long grappled with effective lead management. Introducing appointment scheduling into the lead routing process provides an actionable and time-sensitive status to each new lead, reduces time spent coordinating with each new contact, and allows a sales organization to better serve new contacts and prospects.

The systems and methods disclosed herein are also well suited to the service industry, in particular, the management of initial customers. While traditional lead routing can act as a gatekeeper to qualify and assign a first-time customer to an appropriate appointment resource, it does not provide the positive feedback associated with a confirmed appointment. The present invention can be used to both qualify and route the first-time customer, and also provide a confirmed and guaranteed appointment to the customer.

The detailed description set forth below in connection with the appended drawings is intended as a description of presently preferred embodiments of the invention and does not represent the only forms in which the present invention may be constructed and/or utilized. The description sets forth the functions and the sequence of operations for constructing and operating the invention in connection with the illustrated embodiments. However, it is to be understood that the same or equivalent functions and sequences may be accomplished by different embodiments that are also intended to be encompassed within the spirit and scope of the invention, such as windows involving visual interfaces of different colors, shapes, features and with various combinations of component layouts.

As used herein, contact has the following meaning: A contact is any person seeking to connect with another person or with an organization for the purpose of meeting with the other person (e.g., a representative of the organization) or for the purpose of consuming a service appointment offered by the other person (e.g., a representative of the organization).

As used herein, representative has the following meaning: A representative is any person acting on behalf of himself or herself or on behalf of an organization to follow-up with a contact, typically arranging a meeting with the contact, or providing a service appointment to the contact. A representative may also be a proxy or virtual representative or may be a machine capable of providing an appointment to a contact.

As used herein, appointment has the following meaning: A commitment in time where two or more people agree to meet either in person, by telephone, by video-conference or by any other means of real-time communication. Examples of an appointment include, but are not limited to, an in-person meeting between two or more persons, an in-person service appointment between one or more service consumers and one or more service providers, a telephone meeting between two or more persons, a video-conference between two or more persons, a web-based conference (video and/or audio) session or other computer-based presentation attended by two or more persons, or any combination of the above.

Referring first to FIG. 1A, a block diagram is shown of an availability-based contact routing and scheduling system 5. The system 5 consists of a contact routing controller 10, an appointment scheduling controller 20, a routing configuration database 30 of routing and configuration data and a scheduling configuration database 40 of scheduling configuration and transaction data. There is also at least one externally connected calendar application 50 that represents the free/busy time and commitments of each representative, a communications network 55, and one or more contact user devices 60-1 through 60-N consisting of, but not limited to, computers, telephones, smart phones, mobile computing devices, and/or any other device capable of connecting via the communications network to the contact routing controller 10 and the appointment scheduling controller 20. The externally connected calendar application 50 may reside on one or more computer devices or hosted on a server on behalf of a plurality of users.

In one example, the system components of the system 5 (e.g., contact routing controller 10, appointment scheduling controller 20, database 30 and database 40) reside (or are hosted) on one or more computer servers connected to the network 55. Users connect via the World Wide Web and provide information to these components and receive information from the system via the World Wide Web. The contact routing controller 10 and appointment scheduling controller 20 may contact users via email or via other on-line or off-line means. In another embodiment, the system 5 may provide information via phone and receive information via phone.

Figure 1B:
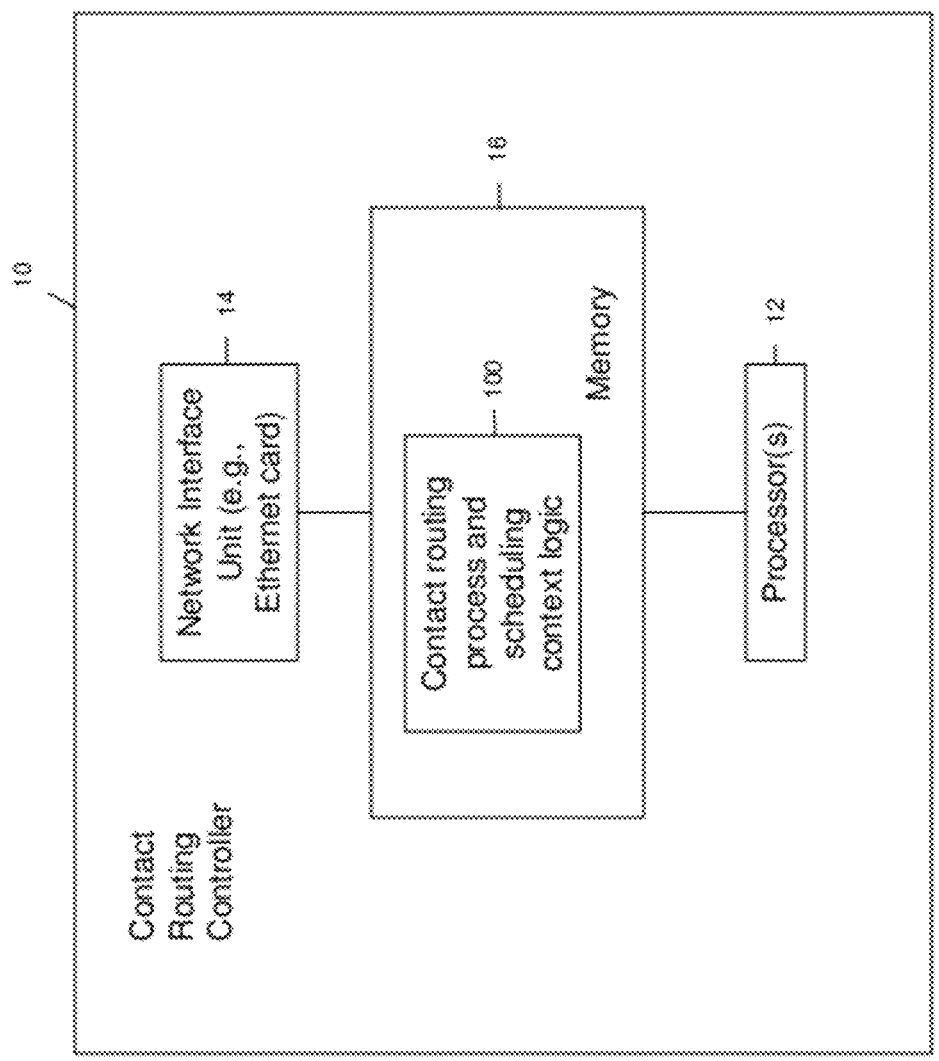
FIG. 1B is an example of a block diagram of a contact router controller forming a part of the system shown in FIG. 1A.

FIG. 1B illustrates an example of the components of the contact routing controller 10. The contact routing controller 10 may comprise one or more data processors (e.g., microprocessors) 12, a network interface device (e.g., Ethernet card or cards) 14 and a memory 16 that stores instructions for contact routing and scheduling context process logic 100 as well as the data for the routing configuration database 30. The operations of the contact routing and scheduling context process logic 100, when executed by the one or more processors 12, are described in connection with the flow charts of FIGS. 2, 4, 8A, 8B and 9, as well as the example user interface screens shown in FIGS. 3A-3C. The contact routing controller 10 operates with the routing configuration database 30 that stores contact routing and configuration data.

Figure 1C:
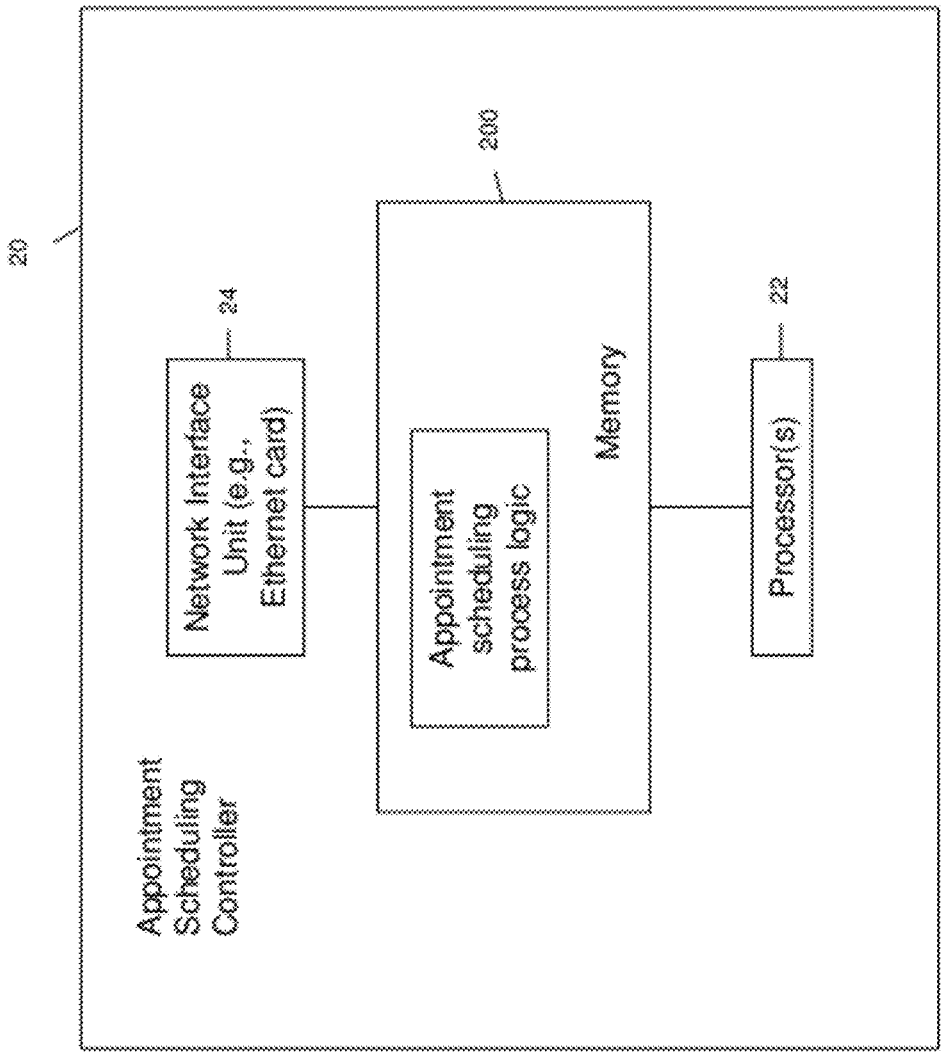
FIG. 1C is an example of a block diagram of an appointment scheduler controller forming a part of the system shown in FIG. 1A.

FIG. 1C illustrates the components of the appointment scheduling controller 20. The appointment scheduling controller 20 may comprise one or more data processors (e.g., microprocessors) 22, a network interface device (e.g., Ethernet card or cards) 24 and a memory 26 that stores instructions for appointment scheduling process logic 200 as well as the data for the scheduling configuration and transaction database 40. The operations of the appointment scheduling process logic 200, when executed by the one or more processors 22, are described in connection with the flow charts of FIGS. 8A, 8B and 9. The appointment scheduling controller 20 operates with the scheduling configuration and transaction database 40 that stores scheduling configuration and transaction data.

As explained above, the operations of the contact routing controller 10 and appointment scheduling controller 20 may be performed by the same computing apparatus or by one or more server computers that are connected to the Internet.

FIG. 2 illustrates the operations involved for a user to first define a contact routing and scheduling context to be offered to a contact for contacting and scheduling an appointment with a representative. These operations are performed by execution of the contact routing and scheduling context process logic 100. These operations include association of an appointment activity to a routing and scheduling context, the defining of rules to enable collection of information from a contact, the defining of rules to route a contact to an appropriate set of representatives, the defining of rules to determine the subset of representatives for which availability will be presented, and the defining of rules to determine the specific representative to be assigned to the appointment time chosen by a contact. The start block 2000 represents an initial point where a user has already gone to the appropriate website to log into the system using a personal login and password and has entered a contact routing and scheduling context creation wizard.

Once inside the wizard the user is prompted to perform the CONFIGURE ONE OR MORE DATA COLLECTION FIELDS operation 2010 for the contact routing and scheduling context being defined. An example of a user interface screen to allow a user to configure the data collection fields is shown in FIG. 3A. In this example, there is a Custom Field definition area 2012 comprising a drop-down menu 2013 for selecting a string type and a blank field to enter the name of the field 2014. There is another Field Values area 2016 that allows a user to enter in window 2017 input values in comma separated list format.

Once the desired data collection fields have been defined, at 2020, the user then performs the DEFINE AND NAME ROUTING AND SCHEDULING RULES operation to determine how a contact will be routed to representatives based upon the contact's responses to data collection fields. These scheduling rules associate a contact to a representative or to a set of representatives based upon the contact's responses to the data collection fields.

At operation 2030, a user is allowed to select and associate a pre-defined appointment activity to the contact routing and scheduling context. The selected pre-defined appointment activity defines the duration of the appointment and also includes availability schedules that define times when each representative is available to perform the activity. At operation 2040, the user is allowed to select a representative to which to route and schedule a contact when the contact cannot be associated according to the defined set of routing rules from operation 2020.

At 2050, the ASSIGN REPRESENTATIVE PRIORITY operation is performed where the user may optionally give priority to representatives with a specified minimum number of available appointment times for the associated activity existing within a specified time-frame.

At the ESTABLISH ALLOCATION RULE operation 2060, the user may optionally define a rule that determines which representative to assign to an appointment when multiple representatives are available at the appointment date and time chosen by a contact.

Figure 3B:
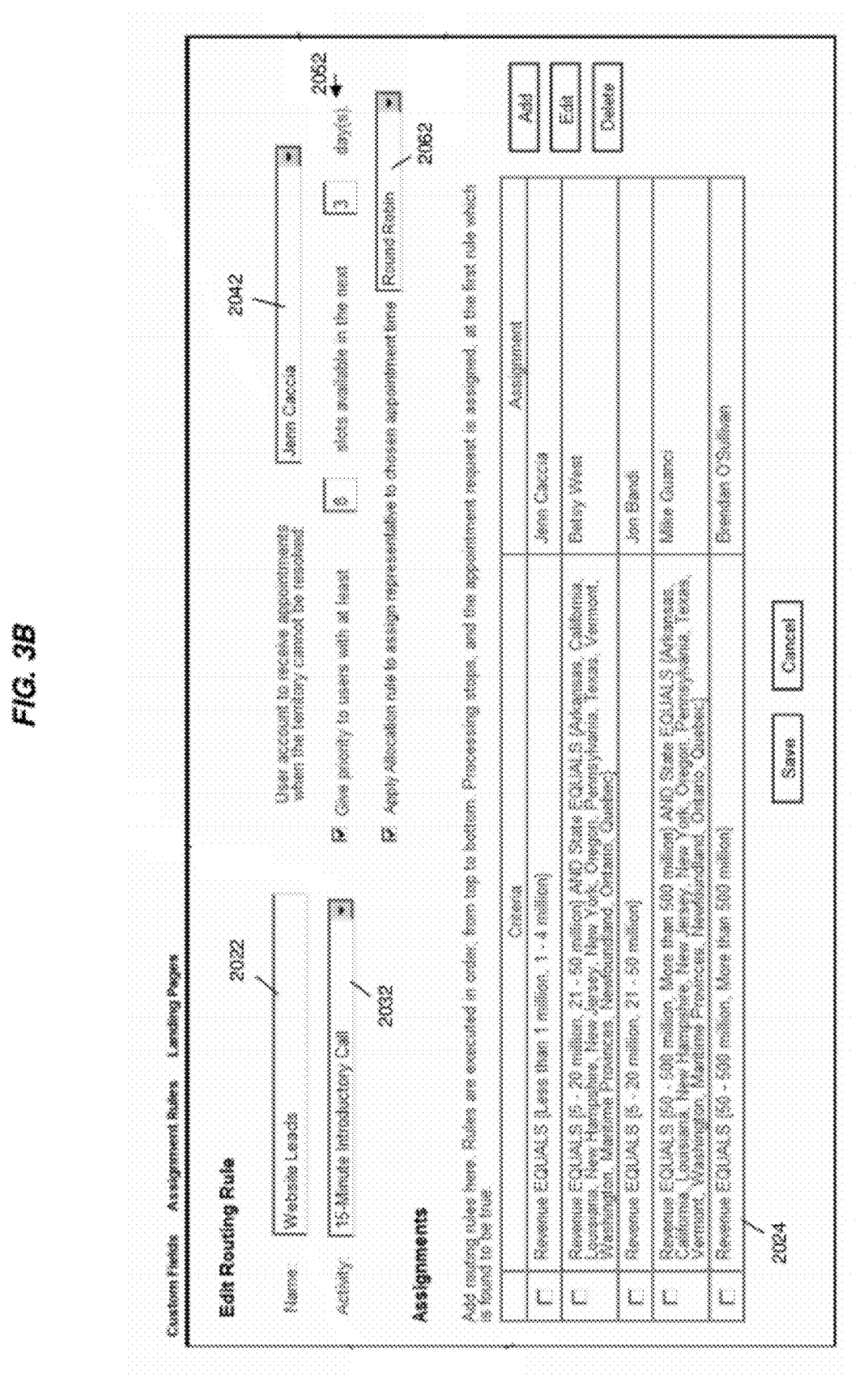

An example of a user interface screen to allow a user to configure named routing and scheduling rules is shown in FIG. 3B. There is a name field 2022 where a user enters the name of a routing rule and a table 2024 that a user can select from.

A drop-down menu 2032 is provided where a user can select one of a plurality of pre-defined appointment activities to be associated with the contact routing and scheduling context rule.

There is a drop-down menu 2042 where a user can select a representative to which to route and schedule a contact for the defined rule, when the contact cannot be associated according to the defined set of routing rules from operation 2020.

The fields at 2052 are used to assign priority to representatives with a specified minimum number of available appointment times for the activity within a specified time-frame.

There is a drop-down menu 2062 that allows a user to select an allocation rule for assigning a representative to a chosen appointment time when multiple representatives are available at the appointment date and time chosen by a contact.

At operations 2070 through 2100, the user defines a contact routing and scheduling context web-based landing page. Specifically, at 2070, a user is allowed to define a contact routing and scheduling context web-based landing page. At 2080, the user is allowed to associate data collection fields with the contact routing and scheduling context web link, and at 2090, to associate routing rules with the contact routing and scheduling context web link. At 2100, a web link with a token representing the contact routing and scheduling context is generated, and the process shown in FIG. 2 ends at 2110.

Figure 3C:
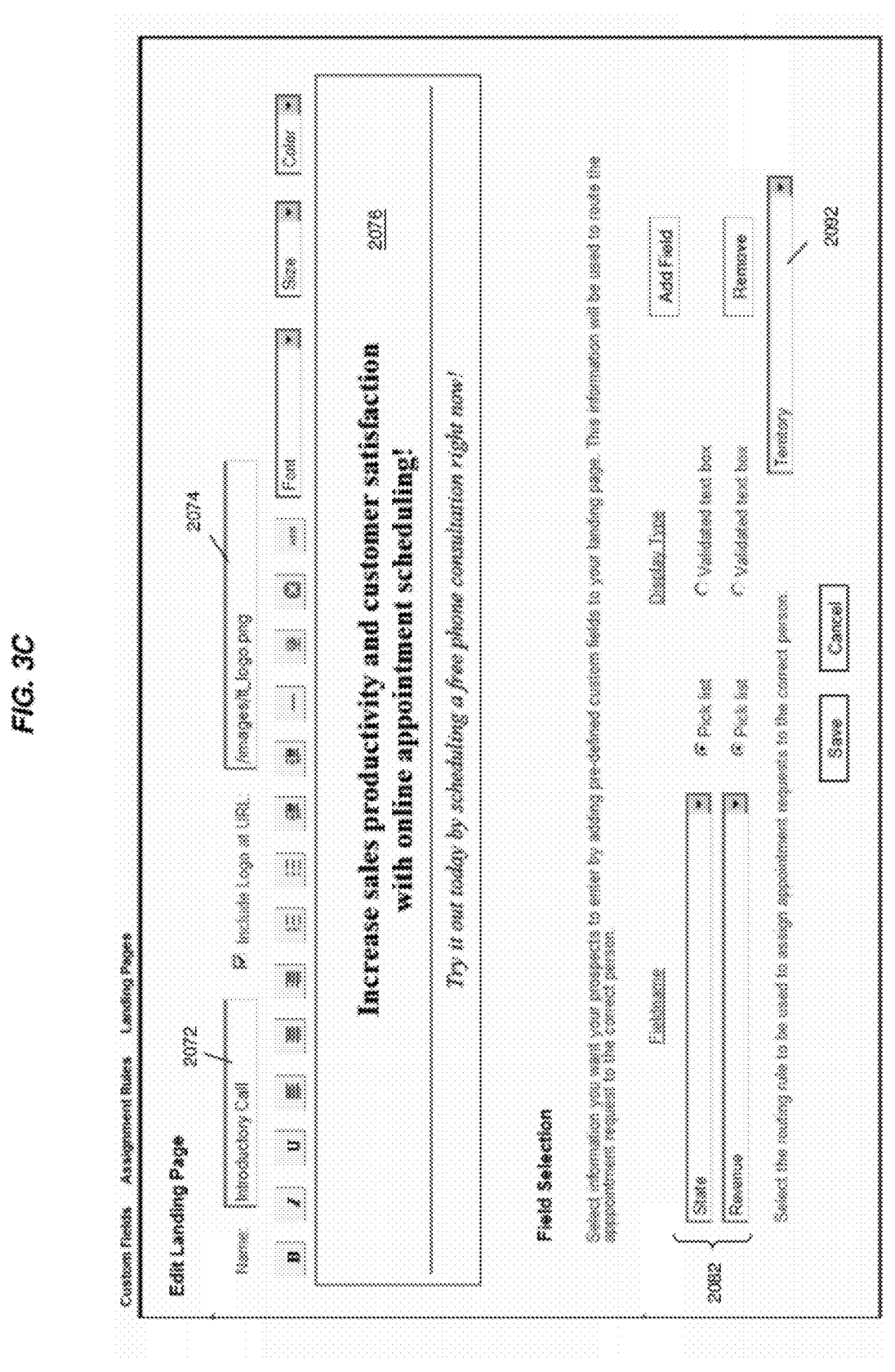

The landing page definition includes one or more data collection fields with a set of contact routing and scheduling rules and the system generates a tokenized contact routing and scheduling web link. An example of a user interface screen for operations 2070-2100 is shown in FIG. 3C. There is a field 2072 in which a user may enter a name for the contact routing and scheduling landing page, and a field 2074 where a user enters a location for an image for a logo or other graphic item to be displayed on the scheduling landing page. An example of the logo or graphic item is shown 2076. The item 2076 may be any image, video, audio or textual information. At 2082, there are drop-down menus that allow a user to associate data collection fields (defined above in connection with operation 2010 and shown in FIG. 3A) with the contact routing and scheduling context web link. At 2092, a drop-down menu is provided that allows a user to associate routing rules with the contact routing and scheduling context web link.

Upon completion of the operations depicted in FIGS. 2 and 3A-3C, the system generates a unique tokenized contact routing and scheduling web link (e.g., Web universal resource locator (URL)) where contacts can be directed to provide information and schedule an appointment.

Figure 4:
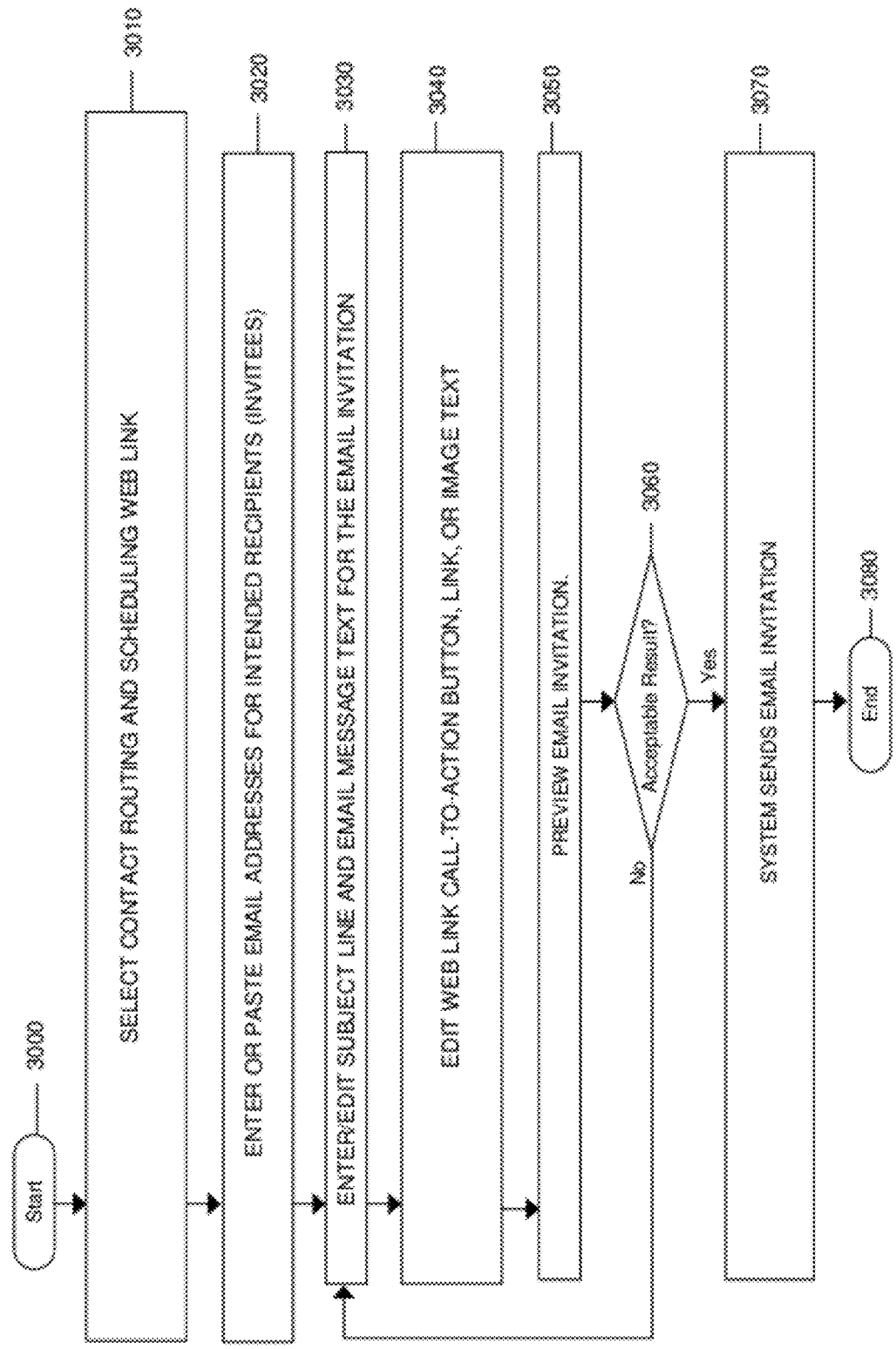
FIG. 4 illustrates an example of a flow chart illustrating operations involved in creating a set of email invitations with an embedded tokenized contact routing and scheduling web link.

Once a tokenized contact routing and scheduling web link has been defined, a user may opt to perform an operation to create email invitations associated with the contact routing and scheduling context represented by the link, and define an action button, link or image that will be embedded into the body of outgoing emails. FIG. 4 illustrates these operations and the user interactive components involved in this process. As an alternative, the system may be configured to perform the routing function with tokens that do not contain identifying information about the recipient, for example, upon entry of the email address of an individual before routing. But in one form, the system may be configured to route the appointment directly to the calendar of the representative that sent the invitation.

First, at 3000, the inviter activates the user interface indicating that they wish to send email invitations to invitees. Next, at 3010, from a list of defined contact routing and scheduling web links, the user selects one defined web link, thereby indicating that this contact routing and scheduling context will be the context for which invitations will be sent out to one or more contacts. The web link may be represented as a link, a button or an image. After selecting a defined web link, at operation 3020, the invitee enters invitee email addresses of recipients, enters or edits email subject line and message text at 3030, and then at 3040 customizes the textual message that the invitees will view in the outgoing email invitation's call-to-action button, link, or image. Each recipient of the email invitation will receive a private email invitation and will not see the email addresses of the other recipients. The ability to define text that will appear on the button, link or image at 3040 provides a contextually-relevant call-to-action for invitations.

Operations 3050-3070 provide the user with an opportunity to preview the email invitation as it will appear to recipients (contacts), to accept or reject the results and, if deemed acceptable, send the results to the selected recipients. However, should the user decided that the appearance of the outgoing email invitations is unacceptable, the user may reject the results and return to the subject matter input phase for the outgoing email invitation subject line and message input boxes at 3030. Thereafter, the inviter may again customize the call-to-action button, link, or image at 3040, preview the appearance of the outgoing email invitations at 3050, and accept or reject the results at 3060. The cycle of rejecting the results and returning to re-enter and customize the outgoing invitation emails will continue until the inviter accepts the results causing the system to send the outgoing email invitations at 3070 and ends the session at 3080. In summary, the process shown in FIG. 4 causes the system to send a personalized invitation to each recipient with an embedded call-to-action button, link, or image which, when clicked by the recipient, invokes a Web URL with a unique access token associated with both the email instance recipient and the associated contact routing and scheduling context. At 3070, the systems sends a separate email message to each recipient (invitee), and each email instance includes a web link that contains a unique token associated with both the email instance for the invitee and the associated contact routing and scheduling context.

Figure 5:
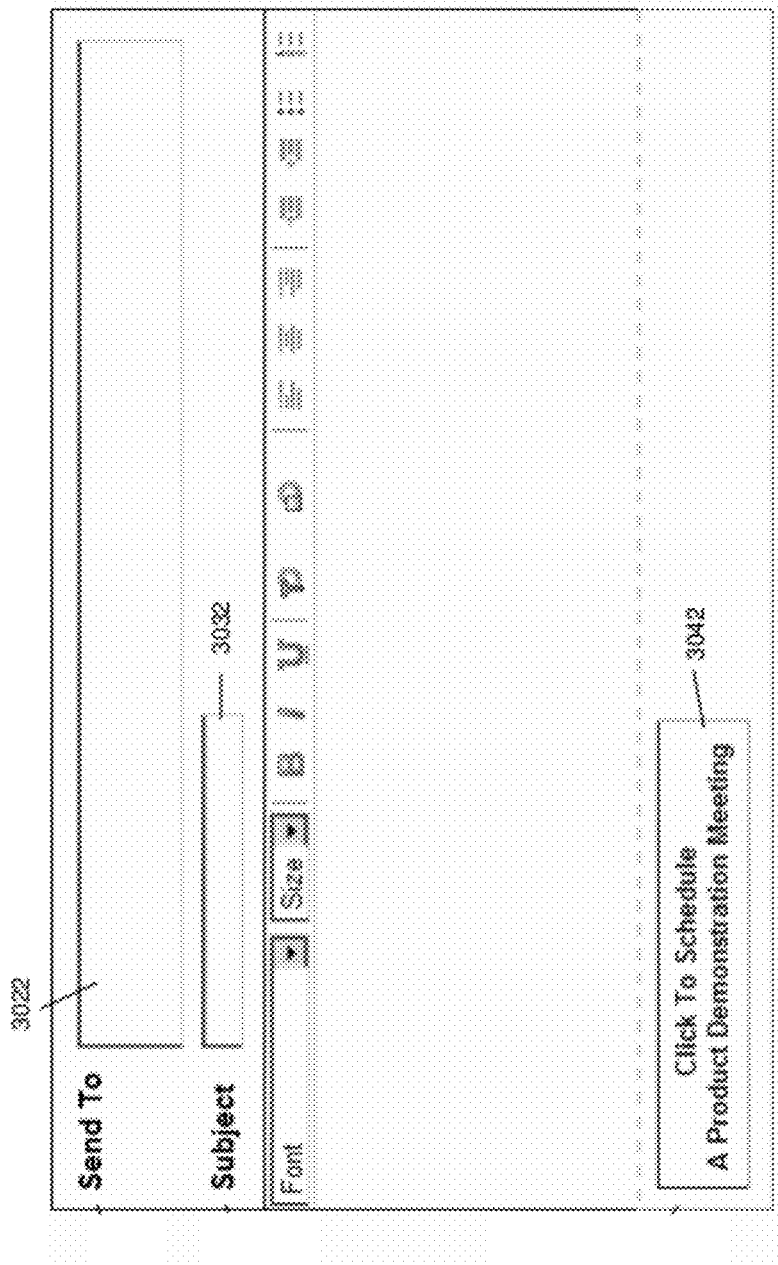
FIG. 5 is a screen shot depicting an example of an email invitation with a call-to-action graphical element.

Turning to FIG. 5, an example of a user interface screen to allow a user to create an email invitation is shown. There is a field 3022 to allow a user to enter an email address of a recipient and a field 3032 allocated to allow a user to enter a subject of the email. There is also a call-to-action button, link or image 3042 for a recipient of the email to take a particular action. As described above in connection with operation 3040, a user may enter text that will appear on the button, ink or image 3042 to provide a contextually-relevant call-to-action in email invitations.

Figure 6:
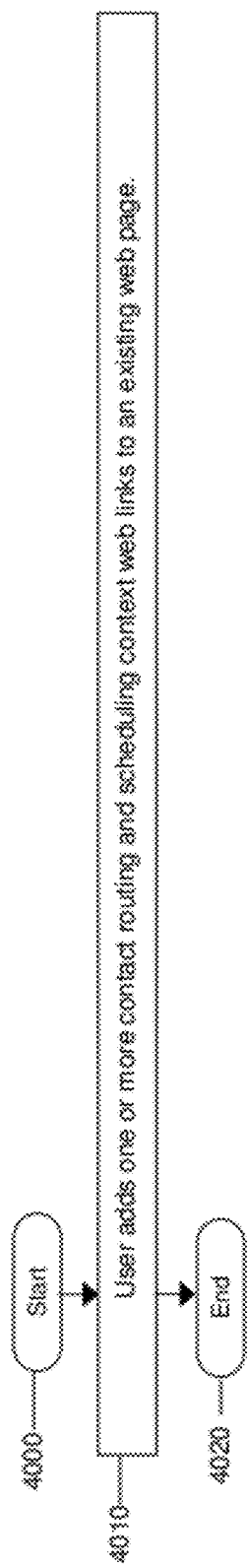
FIG. 6 illustrates an example of a flow chart illustrating the publishing of a tokenized contact routing and scheduling web link on a web page.

FIG. 6 illustrates operations 4000-4020 by which a user can add one or more contact routing and scheduling context web links to an existing web page to allow users who visit the web page to be directed into a contact routing and scheduling process. At 4010, a user adds one or more contact routing and scheduling context links to an existing web page.

Figure 7:
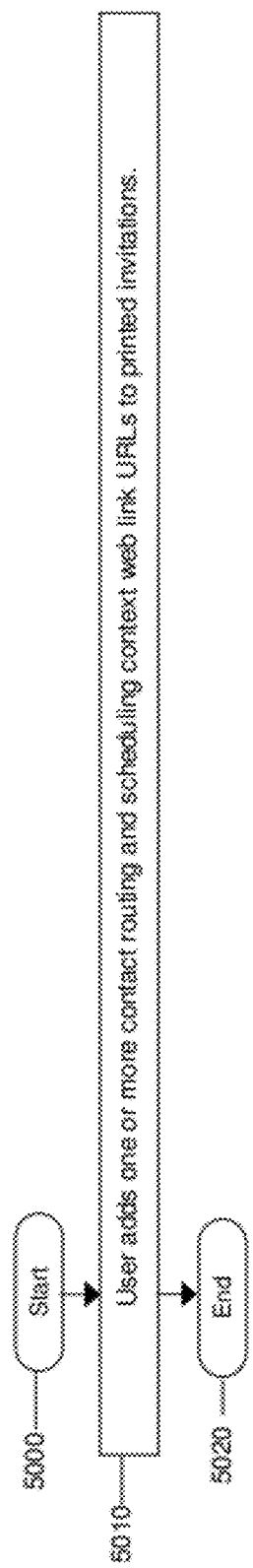
FIG. 7 illustrates a flow chart illustrating the publishing of a tokenized contact routing and scheduling web link on printed materials.

FIG. 7 illustrates operations 5000-5020 by which a user can add one or more contact routing and scheduling context web links to printed materials to allow users to enter the web links into a web browser or other device suitable for connecting to the world wide web and be directed into a contact routing and scheduling process. At 5010, a user adds one or more contact routing and scheduling context web link URLs to invitations or other material to be printed.

Figure 8B:
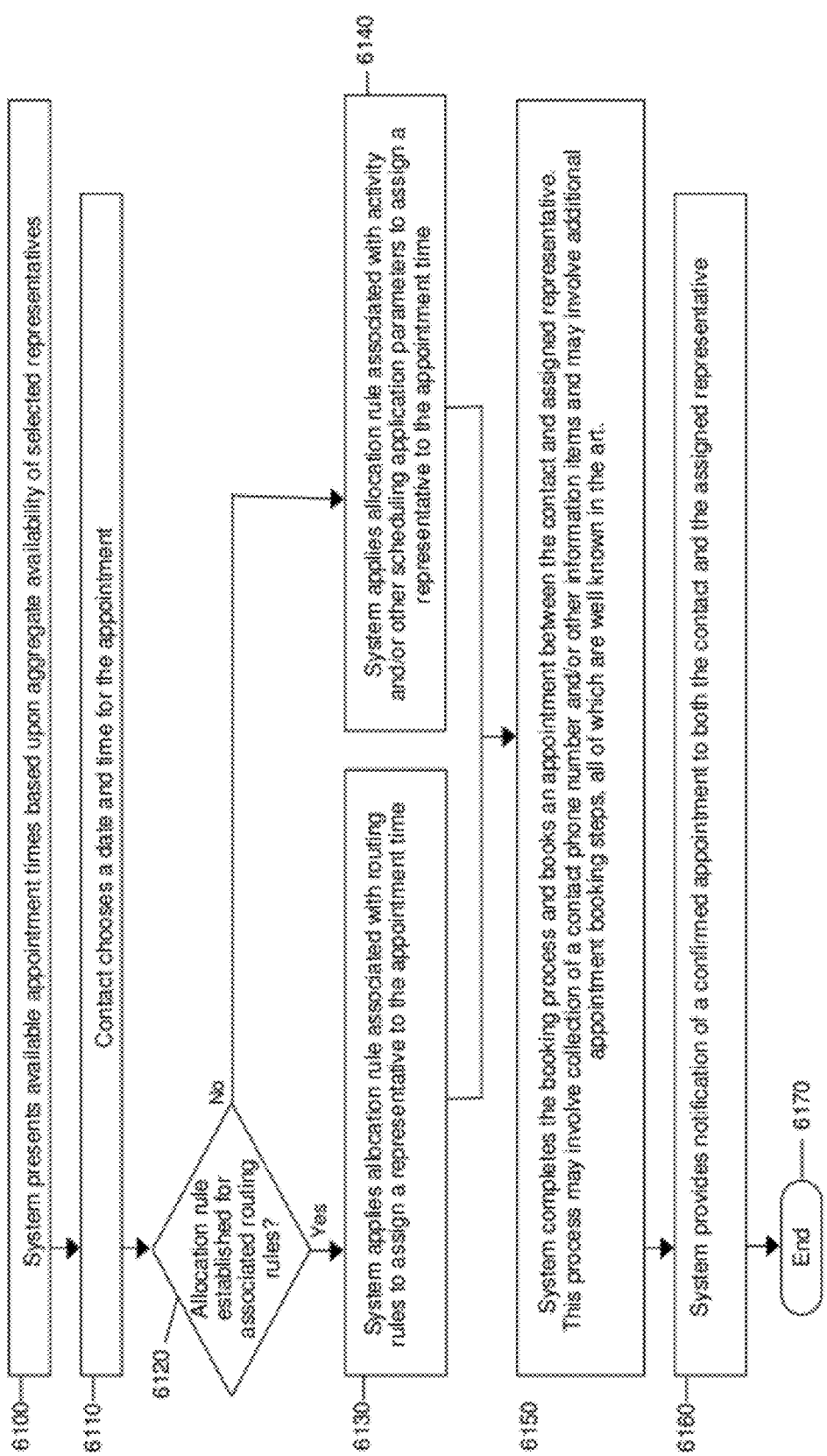

FIGS. 8A and 8B illustrate operations performed when a contact responds to an email invitation to connect with a representative and schedule an appointment. The initial operation 6000 involves the email recipient receiving, opening and reading the email invitation offer to connect with a representative and schedule an appointment.

The next operation 6010 involves the user clicking or selecting a button, link, or image to respond to the invitation offer. The click action invokes redirection at 6020 to a contact routing and scheduling landing page where the token associated with the email instance is used to look up data collection fields and routing rules associated with the contact routing and scheduling context. In other words, the system serves and presents the contact routing and scheduling landing web page in response to an invitee (contact) selecting the web link in an email invitation. As described above in connection with operation 3070, each email instance includes a web link that contains a unique token associated with both the email instance for the invitee and the associated contact routing and scheduling context. As a result, selection of the web link in an email invitation by an invitee reveals to contact routing controller 10 the invitee email address which serves as a unique identifier for the invitee and is used to identify the invitee to the contact routing controller 10.

At 6030, the contact routing and scheduling rules associated with the contact routing and scheduling context for the token are retrieved, and data collection fields are presented to the contact. At 6040, information responses from the invitee are received in the data collection fields, and the contact routing and scheduling rules are applied based on the information received in the data collection fields. The collected information, or any element or elements among the collected information may be used at operation 6050 to filter the set of qualified representatives to those associated with an element or combination of elements collected at operation 6040. If the collected information matches one or more of the routing rules 6050, the system applies the first matching routing rule according to the order in which the routing rules were applied to select the representative or set of representatives associated with the applied routing rule at 6060. If the collected information does not match any of the routing rules, the system selects the representative or set of representatives assigned to handle contacts that cannot be routed according to the associated routing rules at 6070.

At 6080, the system performs a check to determine whether priority should be given to representatives with a specified minimum number of available times for the associated activity (requested in the invitation) in a specified time period relative to the present date and time, and if so, the set of selected representatives selected by the previous operations at 6050-6070 to include only those representatives with the specified minimum number of available times for the associated activity within the specified period are filtered at 6090. Operation 6090 is accomplished in coordination with the appointment scheduling controller which utilizes data from the database of scheduling configuration and transaction data and also data from any externally connected calendar representing the free/busy time and commitments of each selected representative from operations 6050-6070 to determine the number of available times for each selected representative.

After selecting and filtering the set of representatives to which the contact may be routed, at 6100 in FIG. 8B, the system presents available appointment times based upon the aggregate availability of the remaining selected representatives, and the contact is offered these times to choose from. The operation 6100 of generating and presenting aggregate availability across the set of qualified representatives utilizes information representing real-time scheduled availability and existing commitments associated with each selected representative from operations 6050-6070 to construct (generate) a set of available times representing the aggregate availability of all matching representatives as a pool of qualified representatives. This availability is presented to the contact.

At 6110, the contact is allowed to choose a preferred date and time for an appointment. The operation of selection of appointment time preference from among the aggregate availability of the pool of qualified representatives collects a date and time from the contact when the contact is willing to meet with a representative or when the contact would like to attend an appointment with a representative. This selection is referred to as an appointment request.

This is followed at operation 6120 by the system performing a check to determine whether a representative allocation rule has been associated with the routing and scheduling context and if so, applying the allocation rule associated with routing rules to assign a representative to the appointment time at 6130, unless no representative allocation rule has been associated with the routing and scheduling context, in which case the system applies the representative allocation rule associated with the activity and/or other scheduling application parameters to assign a representative the appointment time at 6140.

The operation of allocating a specific representative to an appointment utilizes the availability of each representative as determined by a refresh of the real-time scheduled availability and existing commitments of each qualified representative. In cases where no availability of any qualified representative remains for the selected date and time, operation 6100 is repeated to offer the contact a refreshed view of aggregate availability and operation 6110 is repeated to collect from the contact a another preferred appointment date and time.

In the operations 6150-6170 that follow, the system completes the appointment booking process and books an appointment between the contact and assigned representative. This operation 6150 may involve collection of a contact phone number and/or other information items and may involve additional appointment booking operations, all of which are well known in the art.

The operation 6150 of booking of an appointment between the contact and a specific representative records an appointment between the contact and the representative allocated in operation 6130 or operation 6140. The appointment includes information tying it to the contact routing and scheduling context, and may include the information collected in operation 6040.

The operation of notification of a booked appointment to the contact and the assigned representative at operation 6160 completes the process by sending an appointment confirmation to the contact and/or the assigned representative. This notification may be sent through any means of transmitting information known in the art, such as over the phone, through electronic mail, text message, instant message, or through postal mail.

Figure 9:
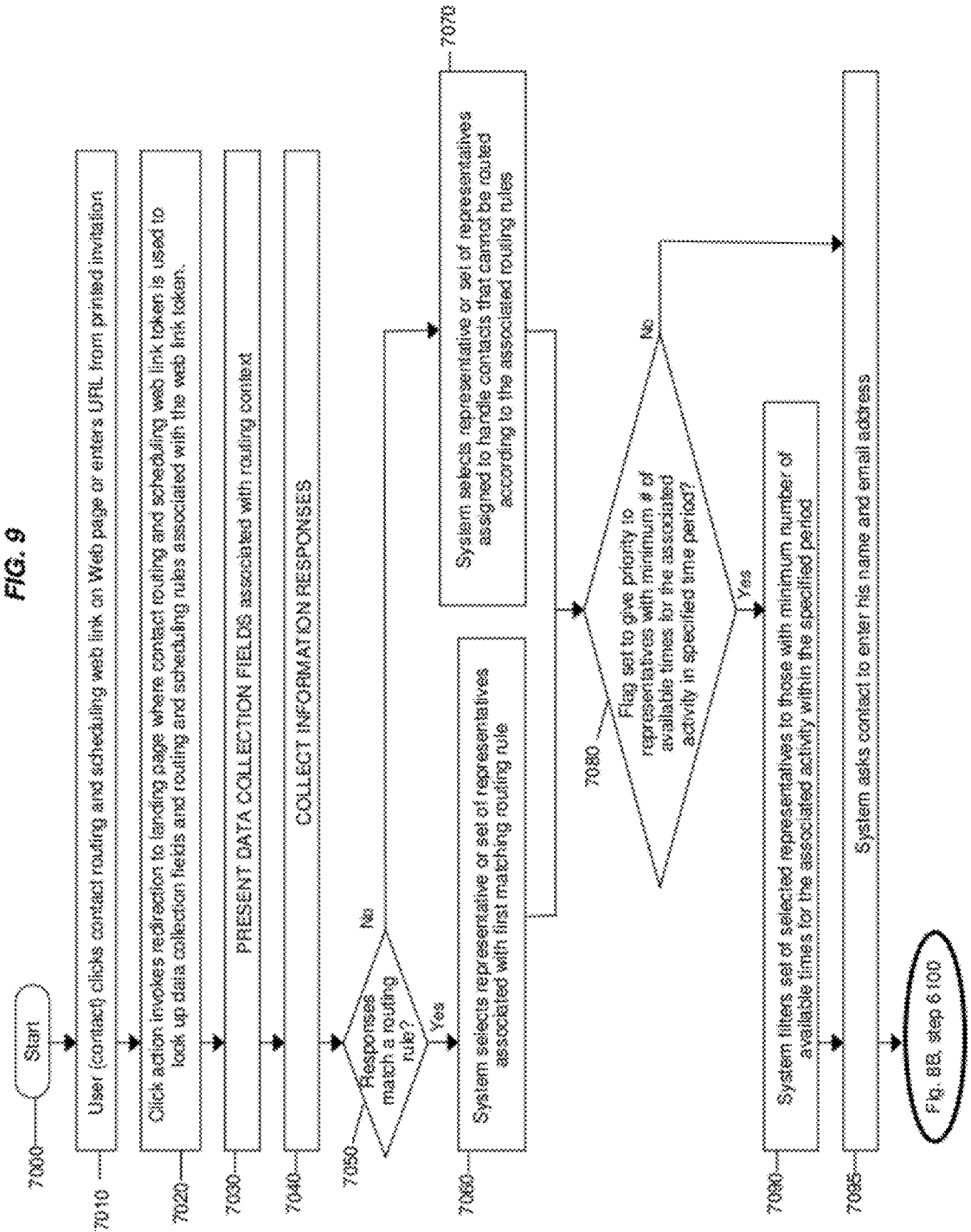
FIG. 9 depicts a flow chart illustrating operations used when a contact responds to a non-email invitation.

Reference is now made to FIG. 9. The process begins at 7000. The process shown in FIG. 9 is used when a user/contact enters a URL from printed material or some other non-email invitation information, and is performed on behalf of a user/contact in an anonymous manner. At 7010, the click action or entered URL invokes a redirection routine at 7020 to a contact routing and scheduling landing page where the token associated with the contact routing and scheduling context is used to look up data collection fields and routing rules associated with the contact routing and scheduling context. There, the contact is prompted to enter information at operations 7030 and 7040 related to routing the contact to an appropriate set of representatives, after which the system leads the contact through a series of operations common to FIGS. 8A, 8B and 9. First, the system determines whether the collected information matches one or more of the routing rules at 7050. The collected information, or any element or elements among the collected information may be used in operation 7050 to filter the set of qualified representatives to those associated with an element or combination of elements collected in operation 7040. If the collected information matches at least one routing rule, the system applies the first matching routing rule according to the order in which the routing rules were applied to select the representative or set of representatives associated with the applied routing rule 7060, unless the collected information does not match any of the routing rules in which case the system selects the representative or set of representatives assigned to handle contacts that cannot be routed according to the associated routing rules 7070.

This is followed by the system performing a check 7080 to determine whether priority should be given to representatives with a specified minimum number of available times for the associated activity in a specified time period relative to the present date and time, and if so, filtering the set of selected representatives selected by the previous operations 7050-7070 to include only those representatives with the specified minimum number of available times for the associated activity within the specified period 7090. This operation 7090 is accomplished in coordination with the appointment scheduling controller which utilizes data from the database of scheduling configuration and transaction data and also data from any externally connected calendar representing the free/busy time and commitments of each selected representative from operations 7050-7070 to determine the number of available times for each selected representative.

After selecting and filtering the set of representatives to which the contact may be routed, at 7095, the system asks the contact to enter his/her name and email address for use in identifying the contact to the system, then presents available appointment times based upon the aggregate availability of the remaining selected representatives FIG. 8B 6100, and the contact is offered these times to choose from. The contact then chooses a date and time for an appointment FIG. 8B 6110, and completes the contact routing and scheduling process according to the operations 6120-6170 of FIG. 8B as described above.

Note that several of the operations 7050-7090 of FIG. 9 are substantially similar to operations 6050-6090 of FIG. 8A as both use the same routing and representative selection process.

As an alternative to the flow depicted in FIG. 8B where appointment times are presented based on aggregate availability, what is presented are the available times of the one representative whose availability meets minimum requirements, and whom all of the other routing rules also select. In other words, all rules are applied in selecting the one representative's calendar from which the contact can choose an appointment time slot. Only then is the list of available times presented. First, the rules based on user input fields are applied, then the rules for minimum number of time slots that must be available are applied, and then the rules for distributing appointments among all those who match the previous rules. If no matching calendar is found, a default is used.

The above description is intended by way of example only.

What is claimed is:

1. A method comprising:
   at one or more server computers forming a part of a web-based contact routing and appointment scheduling system, receiving information to define a contact routing and scheduling context to be offered to a person for contacting and scheduling an appointment with a representative;
   storing data representing the contact routing and scheduling context;
   generating from the stored data a web link with a token representing the contact routing and scheduling context, wherein generating the token comprises generating a web token that is uniquely associated to the email address for the recipient;
   receiving an email address for a recipient;
   sending an email message containing the web link to the email address for the recipient;
   serving a landing web page in response to an invitee selecting the web link in the email message;
   retrieving contact routing and scheduling rules associated with the contact routing and scheduling context for the token;
   based on an identity of the invitee derived from the web link in the email invitation, presenting one or more data collection fields to the invitee associated with the contact routing and scheduling context;
   receiving responses from the invitee in the data collection fields; and
   applying the contact routing and scheduling rules based on the information received in the data collection fields.

2. The method of claim 1, wherein receiving information comprises receiving information to define a plurality of contact routing and scheduling contexts, wherein storing comprises storing data for the plurality of the contact routing and scheduling contexts.

3. The method of claim 1, and further comprising receiving from a user a selection of one of the plurality of contact routing and scheduling contexts, and wherein sending comprises sending the email message with a selected one of the plurality of contact routing and scheduling contexts.

4. The method of claim 1, wherein receiving information comprises receiving information to define names and parameters associated with one or more data collection fields to be presented to a contact to collect response information from the contact used to schedule an appointment for the contact with a representative, and receiving information to define one or more routing rules used for selecting among a plurality of representatives for the appointment for the contact.

5. The method of claim 4, and further comprising receiving information to define one or more informational and data collection fields on a scheduling web page to be presented to a contact upon selection of the web link.

6. The method of claim 5, and further comprising receiving image, video or textual information that is contextually-relevant to an invitation for presentation in proximity to a further web link included in the scheduling web page.

7. The method of claim 1, and further comprising selecting one or more representatives from a set of qualified representatives based on responses received from the invitee that match a routing rule.

8. The method of claim 7, and further comprising determining whether priority is to be given to one or more representatives with a specified minimum number of available times for an activity requested in the invitation for the contact routing and scheduling context, and if so, selecting comprises selecting from only those one or more representatives with the specified minimum number of available times.

9. The method of claim 1, and further comprising retrieving available appointment times for one or more representatives according to the contact routing and scheduling context, and presenting the available appointment times to the invitee.

10. The method of claim 9, and further comprising determining whether there is a representative allocation rule for the contact routing and scheduling context to be used in assigning a representative for the appointment with the invitee, and assigning a representative depending on whether there is a representative allocation rule for the contact routing and scheduling context.

11. The method of claim 10, and further comprising storing data to book an appointment between the invitee and an assigned representative.

12. A method comprising:
    at one or more server computers forming a part of a web-based contact routing and appointment scheduling system, receiving information to define a contact routing and scheduling context to be offered to a person for contacting and scheduling an appointment with a representative;

storing data representing the contact routing and scheduling context;

generating from the stored data a web link with a token representing the contact routing and scheduling context;

printing the web link on printed material;

serving a landing web page in response to entry of the web link;

retrieving contact routing and scheduling rules associated with the contact routing and scheduling context;

presenting one or more data collection fields to the invitee associated with the contact routing and scheduling context;

receiving responses from the invitee in the data collection fields; and applying the contact routing and scheduling rules based on the information received in the data collection fields.

13. An apparatus comprising:

a network interface unit configured to enable communications over a network;

a memory configured to store data;

at least one processor coupled to the network interface unit and the memory, and configured to:

receive information to define a contact routing and scheduling context to be offered to a person for contacting and scheduling an appointment with a representative;

store data representing the contact routing and scheduling context;

generate from the stored data a web link with a web token representing the contact routing and scheduling context, wherein the web token that is uniquely associated to the email address for the recipient;

receive an email address for a recipient;

send an email message containing the web link the email address for the recipient;

serve a landing web page in response to an invitee selecting the web link in the email message;

retrieve contact routing and scheduling rules associated with the contact routing and scheduling context for the token;

based on an identity of the invitee derived from the web link in the email invitation, present one or more data collection fields to the invitee associated with the contact routing and scheduling context;

receive responses from the invitee in the data collection fields; and apply the contact routing and scheduling rules based on the information received in the data collection fields.

\* \* \* \* \*